Patented Nov. 7, 1950

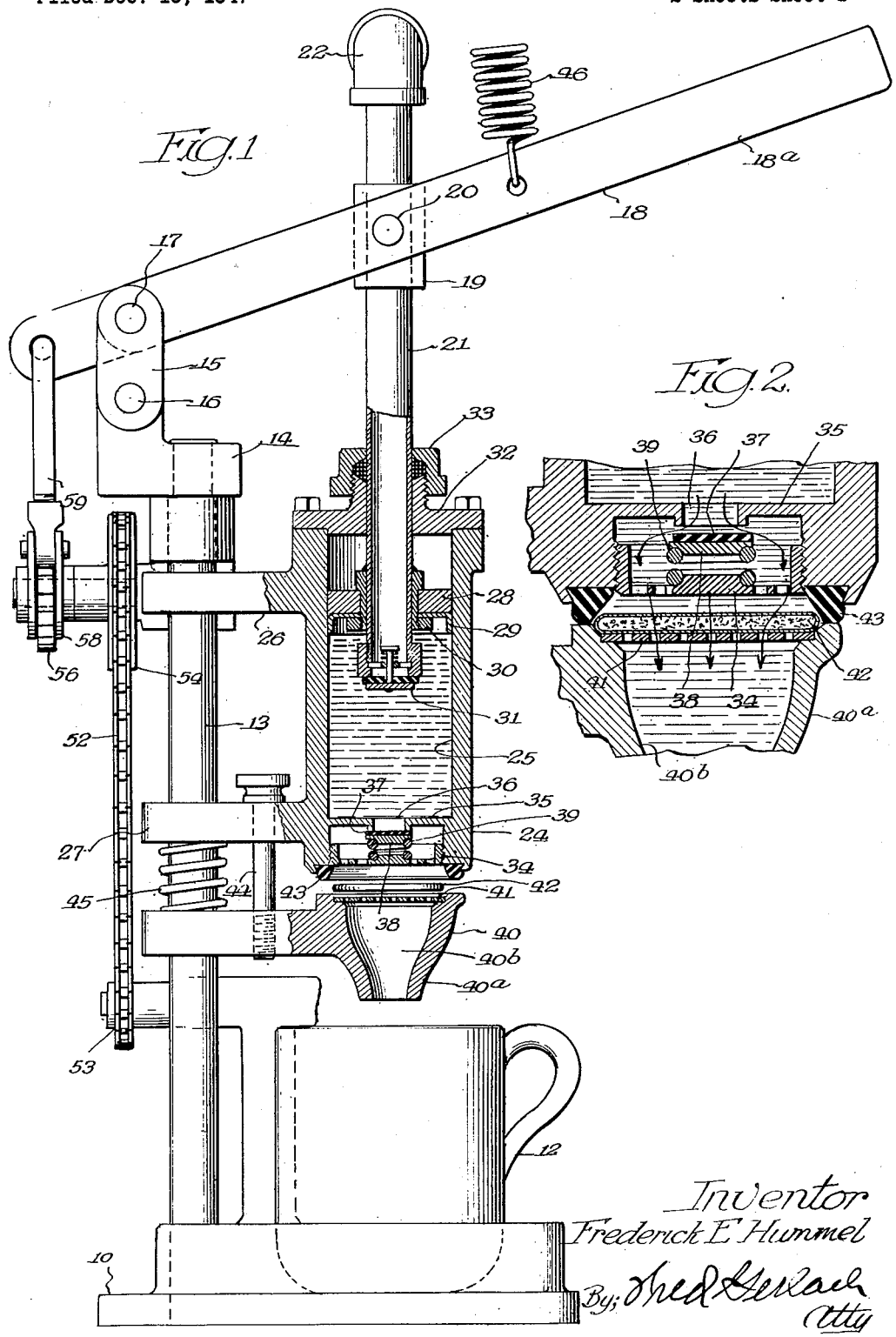

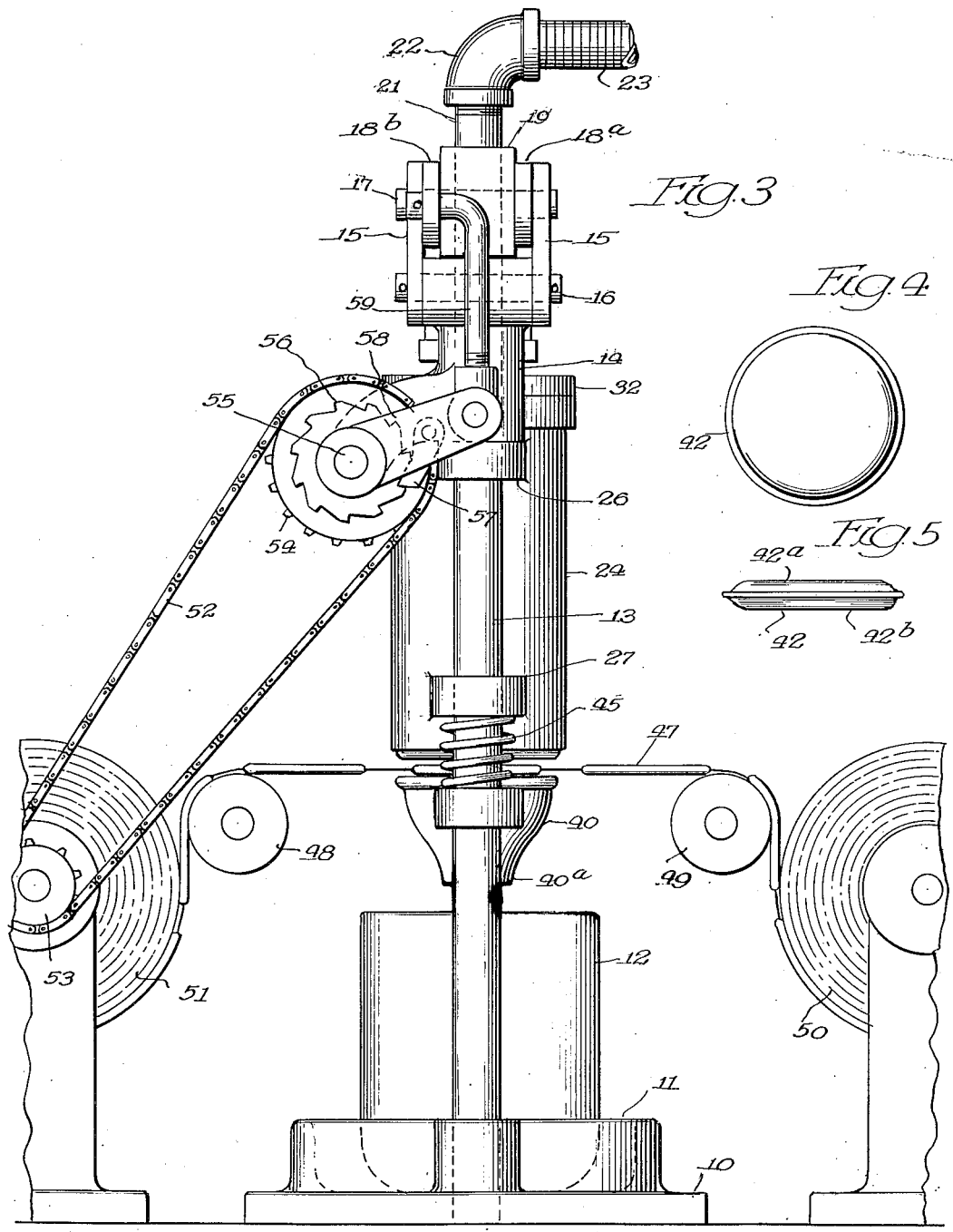

2,529,395

UNITED STATES PATENT OFFICE 2,529,395

COFFEE MAKER AND DISPENSER

Frederick E. Hummel, Chicago, Ill.

Application December 19, 1947, Serial No. 792,646

4 Claims. (Cl. 99—302)

This invention relates to methods and apparatus for making and dispensing liquid comestibles, and particularly hot drinks. More especially it has to do with equipment for making and dispensing hot coffee.

The underlying object, as applied, more specifically, to the making and dispensing of hot coffee, is to provide an apparatus, adapted for use in restaurants and the like, which is operative quickly to make fresh coffee, cup by cup, as ordered—thus obviating the necessity of keeping on hand a supply of ready-made hot coffee, while at the same time avoiding resort to so-called "instant" coffee.

In addition to making it possible at all times to serve freshly made coffee, without delay, a further object is to save the time of restaurant employees who heretofore have found it necessary periodically to divert their attention to the making of fresh batches of coffee, thus delaying the performance of their other duties and thereby seriously reducing the speed at which customers are serviced—especially during rush hours.

My invention is distinguished from prior art practices in the making of coffee in that I force hot water in measured quantities (the ordinary unit being one cup) through a measured quantity of ground coffee bean. Preferably, but not necessarily, I package the ground coffee bean in water-permeable capsules or bags—each bag holding just enough to make one good cup of coffee—and I place the packaged ground coffee bean, one unit at a time, in an apparatus which operates to force through the unit the requisite quantity of hot water.

In carrying out my invention various mechanical arrangements are possible for measuring the hot water and forcing the same through the ground coffee bean and into a cup; but I prefer to utilize an apparatus such as that illustrated in the accompanying drawing, wherein:

Fig. 1 is a side elevation, partly in section, of a coffee maker and dispenser;

Fig. 2 is an enlarged sectional view illustrating the action of the mechanism and postures of certain parts when the hot water is being forced through the ground coffee bean;

Fig. 3 is a rear elevation of the coffee maker and dispenser shown in Fig. 1;

Fig. 4 is a plan view of a package or unit containing ground coffee bean; and

Fig. 5 is an edgewise view of the same package or unit.

The apparatus illustrated comprises a cast base 10 having a cavity 11 for receiving and centering a coffee cup 12, and forming a support for a column 13 consisting of a round steel shaft, to the upper end of which is firmly attached a bracket 14.

A pair of links 15 are pivotally connected at 16 to bracket 14; and the upper ends of said links are, in turn, pivotally connected at 17 to an operating lever 18 consisting of two laterally spaced parallel bars 18a and 18b. Between said bars there is positioned a block 19 having trunnions 20 at either side fitting corresponding openings in bars 18a and 18b, so that said block is rotatable in the plane of Fig. 1. Block 19 is bored to receive a tube or pipe 21, which is firmly secured to the block and provided with an elbow fitting 22 at its upper end, which fitting is connected, in turn, to a flexible hose 23 connected to a source of hot water, not shown.

A casting 24 having a cylindrical bore 25 is formed with two horizontally extending arms 26 and 27 which are bored to fit slidably on column 13 while being keyed against rotation on said column.

Within the cylinder bore 25 and mounted on the lower end portion of tube 21 is a piston 28 which is faced with a leather or rubber cap 29, secured in place by a nut 30. Tube 21 functions as a piston rod and also as a conduit for hot water, and it is provided at its lower end with a check valve 31, which permits hot water to flow downwardly into the cylinder chamber but prevents backward movement of the hot water when the piston is forced down. The upper end of the cylinder casting is provided with a removable cylinder head 32, which may include a stuffing box 33. The stuffing box is not essential, but it serves to exclude dirt from the upper part of the cylinder and is desirable, accordingly, for sanitary reasons.

The lower end of cylinder casting 24 is recessed and internally threaded to receive a perforated plug 34, and is formed with an end wall 35 having a central opening 36. The bottom surface of end wall 35 is finished to form a seat for a resilient valve disc 37, which is attached to a metal valve member 38 supported on a coil spring 39 resting on the interior surface of plug 34. The valve disc is normally held tightly against its seat by spring 39 with more than sufficient force to hold the valve closed against the pressure which obtains within the cylinder chamber, except when pressure is added by forcing the piston down.

A casting 40 fixedly attached to column 13 so that it is neither rotatable nor movable vertically thereon, is formed to provide a spout 40a having a passageway 40b, above which is disposed a perforated plate 41, seated in a recess in the casting 40—which recess is designed to receive a packaged unit 42 of ground coffee bean. The unit is shown in Figs. 4 and 5.

A soft rubber gasket 43 is secured to the lower end of cylinder casting 24 and is designed to seat on the upper surface of casting 40 when the cylinder casting is moved down, as depicted in Fig. 2. Said gasket serves as a liquid-tight seal between the lower end of the cylinder casting and the upper surface of the spout.

An adjusting screw 44 threaded into casting 40 and passing loosely through an opening in arm 27 serves to limit the upward movement of cylinder casting 24; and a coil spring 45 encircling column 13 presses upwardly on the cylinder casting and normally holds the same in its up position, as shown in Fig. 1.

A retracting spring 46 serves to restore handle 18 to its up position, as shown in Fig. 1, and incidentally retracts piston 28 to the position in which it is shown in the same figure.

The package or unit 42, shown in Figs. 4 and 5, comprises two circular pieces 42a and 42b of porous cotton fabric sewed together along their adjoining peripheral margins and enclosing between them a suitable quantity of ground or pulverized coffee bean. These units can be attached to or made part of a continuous strip, as will hereinafter be described; but, except in cases where full automatic operation is warranted, they are fed to the apparatus manually, one at a time, by being laid on the perforated plate 41, so positioned as to be confined within the opening of gasket 43.

Disregarding, for the moment, the automatic feed, which will be described later, and which may or may not be employed, the mode of operation is as follows: With the cylinder casting in its normal up position, as shown in Fig. 1, and with the cylinder filled with hot water, a unit 42 is put in place on plate 41 and handle 18 is pulled down manually. The first effect of so doing is to close valve 31, as a consequence of the initial movement of piston 28. Thereupon, all the manually exerted force is transmitted to cylinder casting 24 through the body of water. The discharge valve does not open at this time because its spring 39 is stronger than spring 45, and, as a result, the cylinder casting moves downwardly until gasket 43 is in tight sealing engagement with the top surface of spout casting 40. The cylinder casting has then reached the limit of its downward travel and further downward movement of handle 18 and piston 28 results in enough pressure being brought to bear on the water in the cylinder to force open the discharge valve against the resistance of spring 39. The water flowing through the discharge valve being under considerable pressure is quickly forced through the coffee-containing unit, and thence downwardly through passageway 40b into cup 12. Manifestly, the entire operation takes place within a period of two or three seconds.

When the handle is released it is returned by its retracting spring, together with piston 28, to its up position; and the up movement of piston 28 relieves the back pressure on check valve 31 and thus allows a fresh supply of hot water to flow into the cylinder chamber via tube 21.

If desired, the cylinder chamber can be provided with an electric heating coil or immersion heater to keep the water hot when the demand for coffee is so light that the water would cool off materially between drawings. But without such provision, hot water can be ensured by pumping the piston a few strokes before inserting the coffee-containing package. This will discharge the water that has cooled in the cylinder chamber and bring in a fresh supply of hot water from the heater tank.

Should it be desired to dispense with the necessity of feeding in the coffee-containing units by hand, the apparatus can be equipped with an automatic feed mechanism of any suitable design; and I have shown one such arrangement wherein the coffee-containing units 42 are mounted at equally spaced distances on a long strip 47 of any suitable material such as muslin, paper or cellophane. In fact, the strip 47 may consitute one side of each unit the other side being a circular disc of porous cloth or filter paper sewed to the strip. In such case the strip itself would, of necessity, be of porous material and preferably cotton cloth.

The strip 47 is shown passing over two guide pulleys 48 and 49 which hold it in proper alignment, and it may be fed from a supply reel 50 and pulled forwardly, step by step, by a drive pulley 51. The latter is shown connected by means of a drive chain 52 and a pair of sprockets 53 and 54 to a shaft 55 on which is mounted and secured a ratchet wheel 56. Said ratchet wheel is arranged to be driven by a pawl 57 carried by an arm 58 which is pivoted on shaft 55 and connected at its distal end to a link 59, the upper end of which is pivotally connected to the rear end of operating lever 18.

Upon each upstroke of lever 18, the ratchet wheel 56 is advanced to such an extent as to bring about a movement of strip 47 equal to the center to center spacing of the coffee-containing units thereon.

Automatic feed mechanisms of this general nature are well known and widely used in conjunction with punch presses, and I do not assert that there is any novelty in that feature of my apparatus apart from the general combination.

It will be apparent that many modifications may be made within the scope and spirit of my invention and, accordingly, I do not wish to be limited otherwise than as indicated by the terms of the appended claims.

I claim:

1. Apparatus for making coffee or for like purposes, comprising: means for supporting and locating a permeable package of ground coffee bean or analogous material from which a solute is to be extracted, said supporting means being adapted to permit liquid to flow downwardly to a receiving receptacle after passing through said package, a member superposed above the said package and reciprocable vertically to a limited extent, said member having a liquid-holding chamber and a discharge port at its lower end leading out of said chamber and providing a passageway from said chamber for discharge of liquid onto said package, a valve normally closing said discharge port but adapted to be forced open by hydraulic pressure developed within said chamber, and means forming a liquid-tight joint between said member and said supporting means when said member is in its down position, said joint encircling said package and effective to confine the flow of liquid emerging from said discharge port to a path including said package, and manually controllable means for forcing liquid out of said chamber through said discharge port.

2. Coffee-making and dispensing apparatus comprising: a stationary member adapted to receive and support a permeable package containing ground coffee bean and further adapted to permit hot water to flow downwardly therethrough after passing through said package, a second member mounted above said stationary member and movable vertically toward and away from said stationary member, said second member having a cylindrical pressure chamber and a discharge port at its lower end, a spring-pressed discharge valve normally closing said discharge port and adapted to be opened by pressure within said chamber, means for establishing a liquid-tight joint between said members when said second member is in down position, so that water can be forced under pressure from said chamber and through said discharge port and said package, a piston reciprocably movable in said chamber, a tubular piston rod carrying said piston and opening into said chamber to form an intake port, a check valve for said intake port, said check valve being operative to admit inflow to said chamber and to prevent outflow therefrom, said piston rod being adapted to function as a conduit for supplying water to said chamber, means for reciprocating said piston rod together with said piston, and a spring normally holding said second member in its up position, said spring being of such stiffness relatively to that of said discharge valve that said second member will move to its down position in response to a downward movement of said piston before said discharge valve will open.

3. Coffee-making apparatus comprising a stationary member having a recess adapted to receive and locate a permeable package containing ground coffee bean, said stationary member having a passageway extending downwardly from below said permeable package and adapted to direct hot coffee into a receptacle, a second member mounted above said stationary member and movable vertically toward and away from said stationary member, said second member having a cylindrical pressure chamber and a discharge port at its lower end, a spring-pressed discharge valve normally closing said discharge port and adapted to be opened by pressure within said chamber, an annular gasket carried by one of said members and adapted to form a liquid-tight joint between said members when said second member is in down position, so that water can be forced under pressure from said chamber and through said discharge port and said package, a piston reciprocably movable in said chamber, a piston rod carrying said piston, an intake port for said chamber, a check valve permitting inflow to said chamber through said intake port, and means for reciprocating said piston rod together with said piston and said second member.

4. Coffee-making and dispensing apparatus comprising: a base adapted to receive a cup, a column extending vertically from said base, a stationary member carried by said column above said base and having a spout portion including a recess for receiving a quantity of ground coffee bean, a perforated plate for supporting the coffee bean, and a passageway leading downwardly from below said plate, a second member reciprocable vertically on said column and located above said stationary member, said second member having a cylindrical pressure chamber and a discharge port at its lower end, said members, conjointly, forming a compartment within which the coffee bean is enveloped when said members are brought together, said discharge port interconnecting said chamber with said compartment, a valve normally closing said discharge port, said chamber having an intake port, an intake valve for controlling inflow of water to said chamber through said intake port, a piston reciprocable in said chamber, a piston rod connected to said piston, and a manually operable lever for actuating said piston rod and piston.

FREDERICK E. HUMMEL.

REFERENCES CITED

The following references are of record in the file of this patent:

UNITED STATES PATENTS

| Number | Name | Date |
|---|---|---|
| 41,974 | Class et al. | Mar. 22, 1864 |
| 1,467,778 | Paola | Sept. 11, 1923 |
| 1,837,252 | Carter | Dec. 22, 1931 |
| 2,283,967 | Brown | May 26, 1942 |

FOREIGN PATENTS

| Number | Country | Date |
|---|---|---|
| 18,541 | France | Feb. 16, 1914 |
| 266,438 | Italy (addition 439,740) | July 28, 1929 |
| 18,168 | Great Britain | Oct. 19, 1916 |
| 293,551 | Great Britain | July 12, 1928 |